(12) United States Patent
Kim et al.

(10) Patent No.: US 6,344,968 B2
(45) Date of Patent: Feb. 5, 2002

(54) CONTROLLER FOR ELECTRONIC GOODS

(75) Inventors: Ki-Seon Kim, Suwon-si; Soon-Haeng Heo, Yongin-si; Ki-Hyup Sung, Suwon-si, all of (KR)

(73) Assignee: Samsung Electronics Co., Ltd., Suwon (KR)

(*) Notice: Subject to any disclaimer, the term of this patent is extended or adjusted under 35 U.S.C. 154(b) by 11 days.

(21) Appl. No.: 09/339,193

(22) Filed: Jun. 24, 1999

(30) Foreign Application Priority Data

| Jun. 24, 1998 | (KR) | 98-011065 |
|---|---|---|
| Jun. 24, 1998 | (KR) | 98-011066 |
| Jun. 24, 1998 | (KR) | 98-011067 |
| Jun. 24, 1998 | (KR) | 98-023956 |
| Jun. 24, 1998 | (KR) | 98-023957 |

(51) Int. Cl.$^7$ .............................. G06F 1/16; H05K 7/14
(52) U.S. Cl. .................. 361/681; 361/682; 361/683; 361/686; 312/273; 312/275; 312/223.2; 348/794
(58) Field of Search ................. 361/685, 680, 361/681, 682, 683, 686, 727; D14/388–396, 336, 339, 340; 360/97.01, 98.01; 312/294, 319.1, 273, 275, 332, 323, 333, 7.2, 223.1, 223.2; 348/794

(56) References Cited

U.S. PATENT DOCUMENTS

| 3,732,965 A | * | 5/1973 | Mero .................... 197/186 A |
|---|---|---|---|
| 4,086,655 A | * | 4/1978 | Tanimoto et al. ........... 364/705 |
| D255,899 S | * | 7/1980 | Karas et al. ................. D14/42 |
| 4,595,993 A | * | 6/1986 | Yao ............................. 364/708 |
| 5,000,555 A | * | 3/1991 | Sato ........................... 350/530 |
| 5,062,609 A | * | 11/1991 | Hames et al. ............... 248/676 |
| 5,097,392 A | * | 3/1992 | Tanaka et al. .............. 361/391 |
| 5,187,641 A | * | 2/1993 | Muskatello et al. ........ 361/380 |
| 5,625,533 A | * | 4/1997 | Kim et al. ................... 361/681 |
| 5,673,169 A | * | 9/1997 | Wicks ......................... 361/680 |
| 5,805,676 A | * | 9/1998 | Martino .................... 379/93.17 |
| 6,038,127 A | * | 3/2000 | Ries ........................... 361/680 |

FOREIGN PATENT DOCUMENTS

| JP | 61-8527 | * | 1/1986 | ............. F24C/1/00 |
|---|---|---|---|---|
| JP | 6-195152 | * | 7/1994 | ............. G06F/1/16 |

* cited by examiner

Primary Examiner—Leo P. Picard
Assistant Examiner—Anatoly Vortman
(74) Attorney, Agent, or Firm—Staas & Halsey LLP

(57) ABSTRACT

A controller for electronic goods having a control box capable of operating more smoothly when the control box is drawn out or inserted. The controller includes a housing mounted on a case of the electronic goods. The controller is provided with guiders on both sides and a control box. The control box includes a plurality of function keys on an upper side and is insertable into in the housing. The control box is guided by the guiders and includes a rack positioned between a pair of curved surfaces in the rear of the control box and a pressing member pressing the curved surfaces of the control box by an elastic force of an elastic member mounted on a rear of the housing. Also included in the control box is a device combined with the rack to reduce the speed of the control box when the control box is drawn out of or inserted into the housing. The control box further includes a heart cam constraint device to stop the control box when the control box is inserted into the housing.

26 Claims, 14 Drawing Sheets

CONTROLLER FOR ELECTRONIC GOODS

CROSS REFERENCE TO RELATED APPLICATIONS

This application claims the benefit of Korean Application Nos. P1998-023956, P1998-023957, U1998-011065, U1998-011066, U1998-011067, all filed Jun. 24, 1998, in the Korean Patent Office, the disclosures of which are incorporated by reference.

BACKGROUND OF THE INVENTION

1. Field of the Invention

The present invention relates to a controller, and more particularly, to a controller mounted on a case for electronic goods, like a monitor, for drawing out a control box or inserting it into a case.

2. Discussion of the Related Art

In general, electronic goods, like a monitor for displaying images, are provided with a controller for adjusting such functions as width, height, luminosity or brightness of images. The controller is fixed to a monitor case or made as one control box and, thus, hidden within the case if not being used and exposed if being used. There are two types of control boxes, one of which is slidable relative to the case to be inserted into or drawn out from the case and the other is provided with a cover connected with a hinge capable of opening or closing to reveal a plurality of functional keys provided with the case.

A controller provided with a control box which is slid into or out of a case is illustrated in Korean Utility Model No. 114,104.

Such a controller is provided with a controller housing fixed to a case of the electronic goods, a control box mounted on the controller housing to be insertable, a spring pressing out the control box to draw it out and a damper mounted on a side of the housing and the control box to prevent rapid movement of the control box. Here, the spring is a coil spring which has a relatively small spring force.

When the control box is not being used, that is, when the control box is within the case, the control box is restrained by a push catcher and located within the housing. To use the controller, the restraint of the control box under the push catcher should be released in order for the control box to come out of the housing.

But as described above, in a conventional controller, the control box must be pressed strongly to be released and, thus, it is not convenient to use the conventional controller.

In addition, as the control box is released by the spring force from the housing, the control box moves at a predetermined speed. Further, as the moving speed is slow due to the relatively small spring force, it takes a long time to draw out the control box.

Furthermore, as the damper is mounted on a side of the control box and the housing, it cannot be used efficiently. That is, as the control box and the housing are designed to have a long side length and the damper is mounted on a side thereof, the damper's reducing force cannot affect the opposite side.

Especially, when the control box is drawn out, there is not enough room for movement between the control box and the case and, thus, interference between them occurs and, as a result, there is a loss in the reliability of these types of products.

Moreover, as a conventional controller uses a coil spring to release the control box, the control box is released by the coil spring slowly at a predetermined speed.

SUMMARY OF THE INVENTION

Accordingly, in order to overcome such drawbacks in the conventional art, it is therefore an object of the present invention to provide a controller for electronic goods having a control box capable of operating more smoothly when the control box is drawn out of or inserted into the electronic goods.

It is another object of the present invention to provide a controller for electronic goods in which the control box has a variable opening speed.

It is another object of the present invention to provide a controller for electronic goods, having a control box which does not interfere with a case when the control box is opened or closed.

Additional objects and advantages of the invention will be set forth in part in the description which follows, and in part, will be obvious from the description, or may be learned by practice of the invention.

To achieve these objects and other advantages and in accordance with the purpose of the present invention, as embodied and broadly described, there is provided a controller for electronic goods including a housing mounted on a case of electronic goods and provided with guiders on both sides and a control box including a plurality of function keys on an upper side. The control box is inserted into the housing and guided by the guiders. The control box includes a rack positioned between a pair of curved surfaces in the rear of the control box. A pressing member presses the curved surfaces of the control box by an elastic force of an elastic member mounted on a rear of the housing. A device combined with the rack of the control box is provided to reduce the speed of the control box when the control box is drawn out or inserted. A heart cam constraint device is provided to stop the control box when the control box is inserted into the housing. The curved surfaces each include a sharp inclination on an upper side thereof and a slow inclination on a lower side thereof. The pressing member is positioned in the lower sides of the curved surfaces when the control box is inserted. Each guider is a guide bar formed at respective opposite sides within the housing and the control box is provided with guide grooves respectively formed in both sides thereof for receiving the respective guide bar.

Alternatively, each guider is a guide groove formed at respective opposite sides within the housing and the control box is provided with guide bars formed in both sides thereof and received in the respective guide grooves.

The guide grooves and the guide bars are formed in circular arcs and the guide grooves are each provided with a straight line part in a front part of the circular arc. Each guide groove includes a plurality of grooves capable of receiving a lubricant at the bottom of the control box. The grooves receiving the lubricant have a predetermined angle of inclination in an operating direction of the control box. The device for reducing the speed of the control box includes a damper mounted in the middle of the housing and a gear rotatably mounted on an upper side of the damper and combined with a rack of the control box.

The heart cam constraint device includes a heart cam formed in a lower side of the control box and a heart cam driven member provided at a rear lower side of the housing. The heart cam includes a pin path formed in a lower side of the control box and a heartshaped protrusion formed in a front of the pin path. The heart cam driven member includes a pin guided along the pin path and a flat spring mounted on the housing to press the pin to the pin path.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
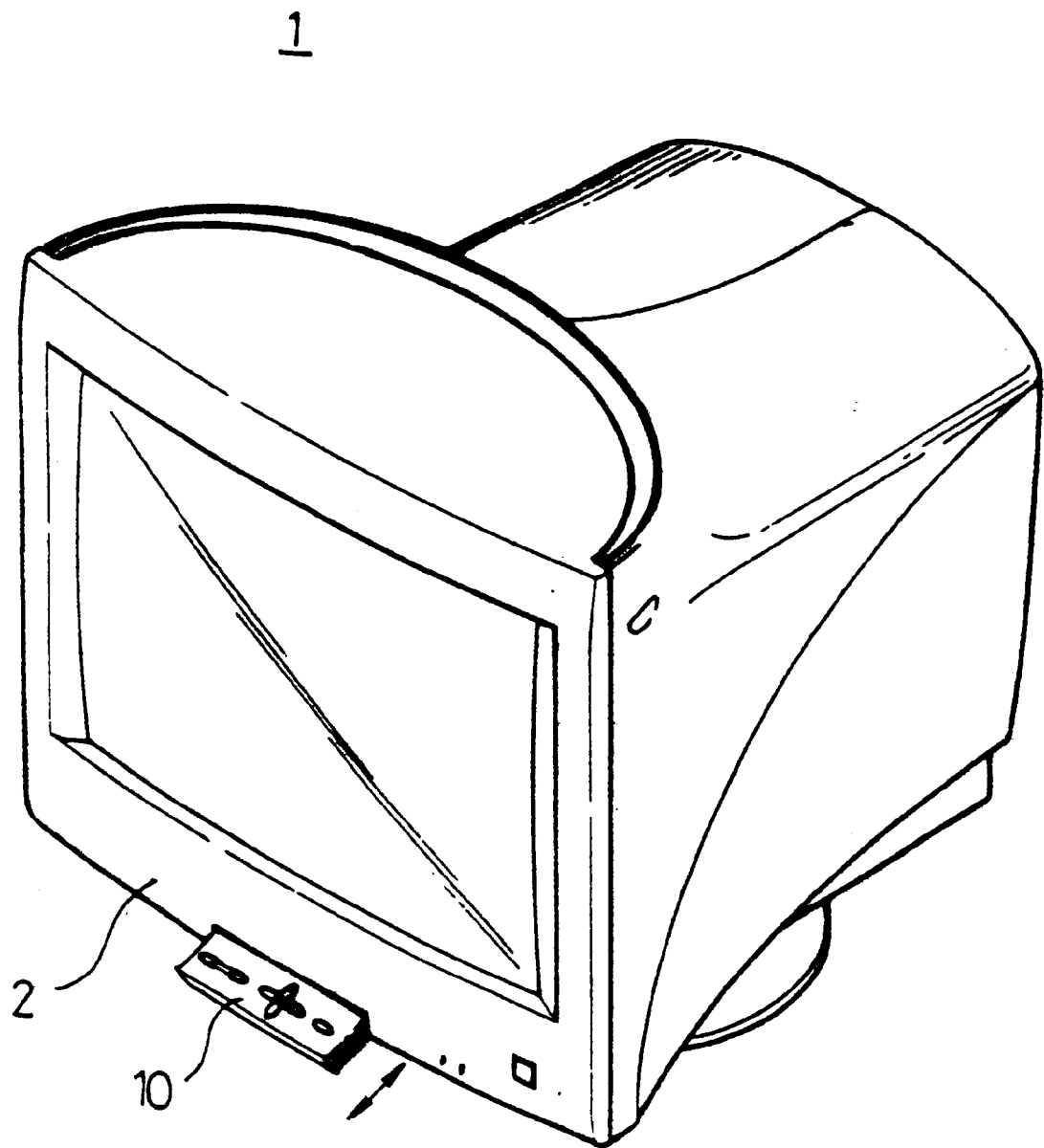
FIG. 1 is a total perspective view of a monitor adopting a controller according to the present invention.

Reference will now be made in detail to the present preferred embodiment of the present invention, examples of which are illustrated in the accompanying drawings, wherein like reference numerals refer to the like elements throughout.

Figure 2:
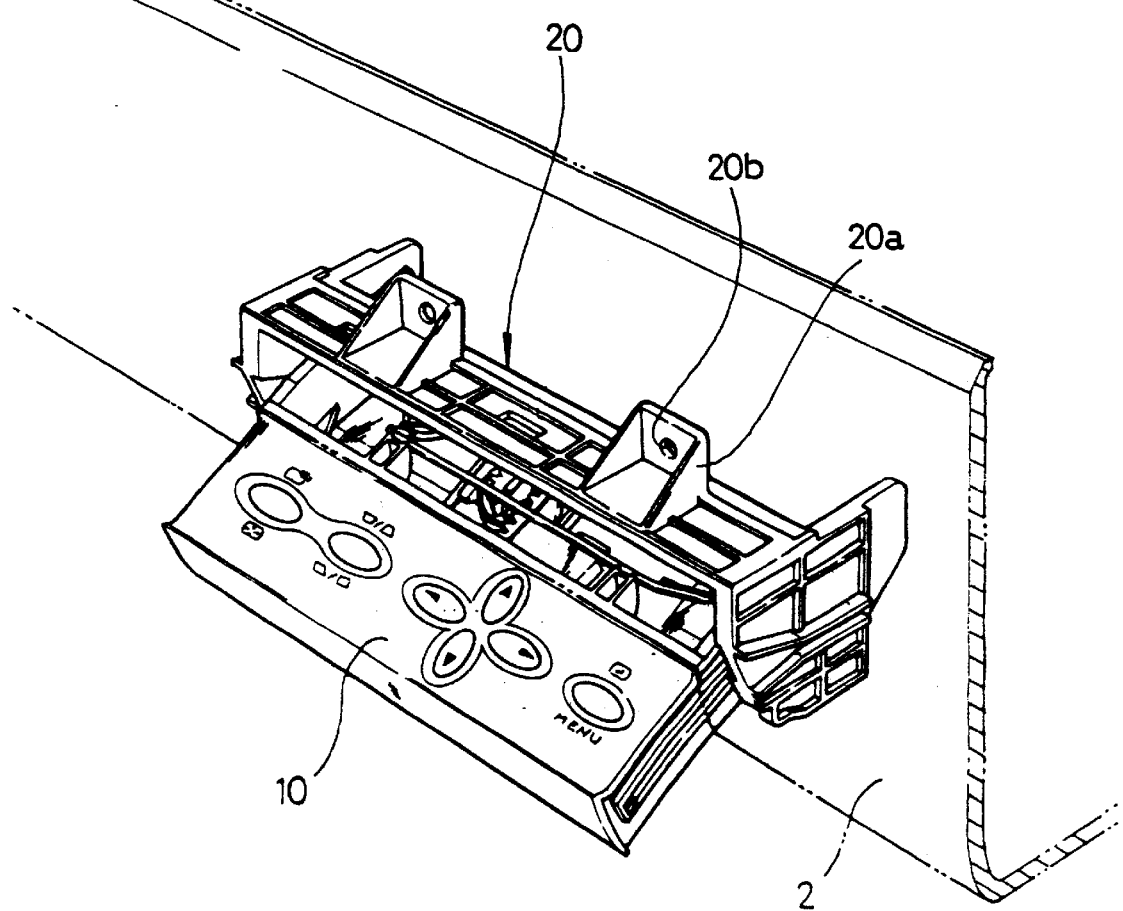
FIG. 2 is a perspective view showing the controller according to the present invention.

FIG. 1 shows a display 1 having a control box 10 according to the present invention. The control box 10, when unused, is put into a case 2 of the display 1 and, to be used, is drawn out of the case 2. The control box 10, as shown in FIG. 2, is slidebly mounted on a housing 20 which is mounted within the case 2. A plurality of functional keys 11 are provided on the upper side of the control box 10.

Figure 3A:
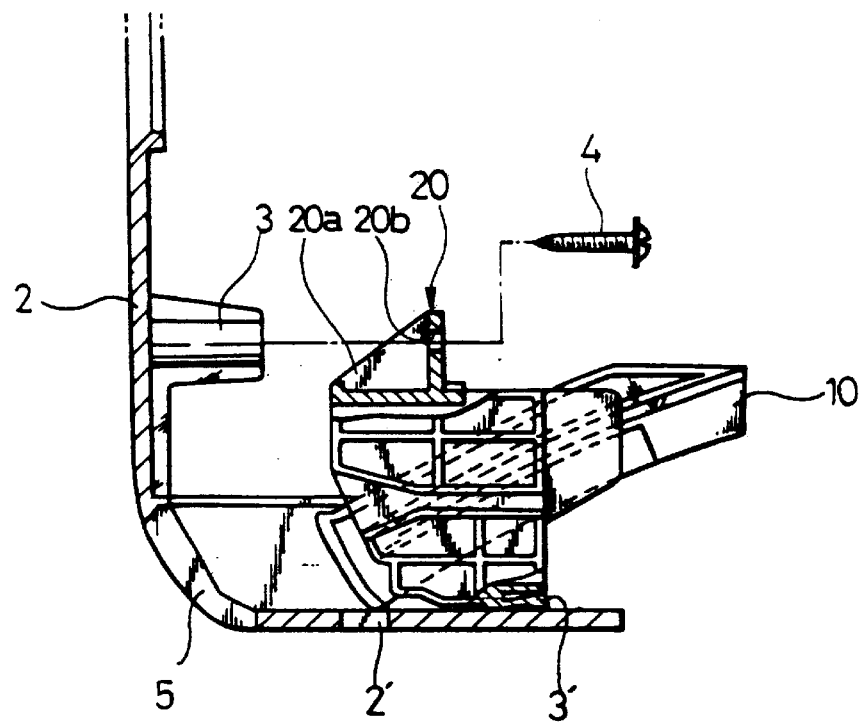
FIGS. 3A–3B are side sectional views showing how the controller according to the present invention is mounted on a case.
Figure 3B:
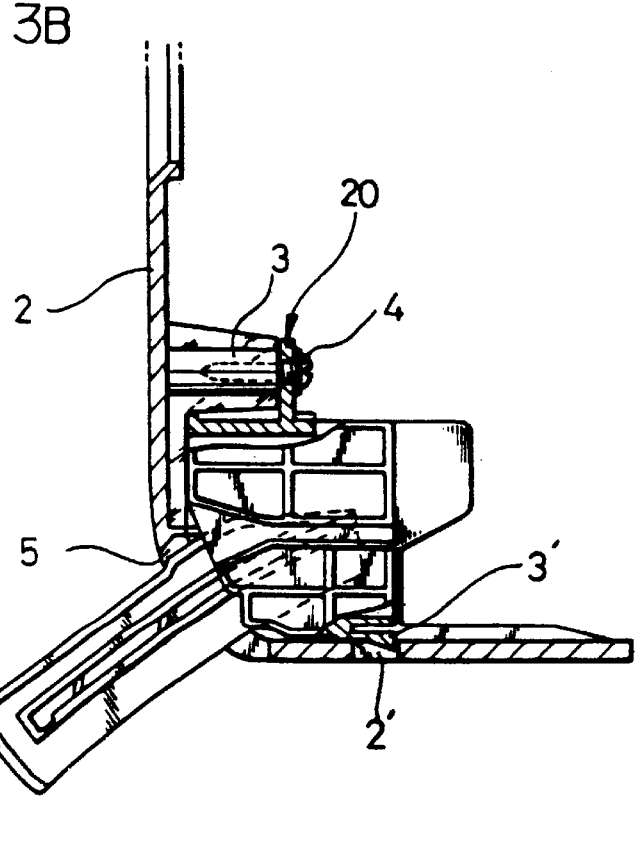

The housing 20, as shown in FIG. 2, is provided with a pair of brackets 20a, each of which has a hole 20b in the middle part thereof. A pair of snap protrusions 3' are formed on the bottom of the respective brackets 20a. The housing 20 is fixed to the case 2. A screw 4 is inserted through each of the holes 20b to the respective boss 3 formed within the case 2 and the snap protrusions 3' are fixed to respective snap grooves 2' formed in the case 2. The holes 20b, formed in the respective brackets 20a, are located in respective bosses 3, which are formed within the case 2, as shown in FIGS. 3A–3B. Thus, the housing 20 can be solidly fixed to the case 2 as shown in FIG. 3B. The control box 10, mounted on the housing 20, is inserted or drawn out through a drawing hole 5 formed in a front side of the case 2.

Figure 4A:
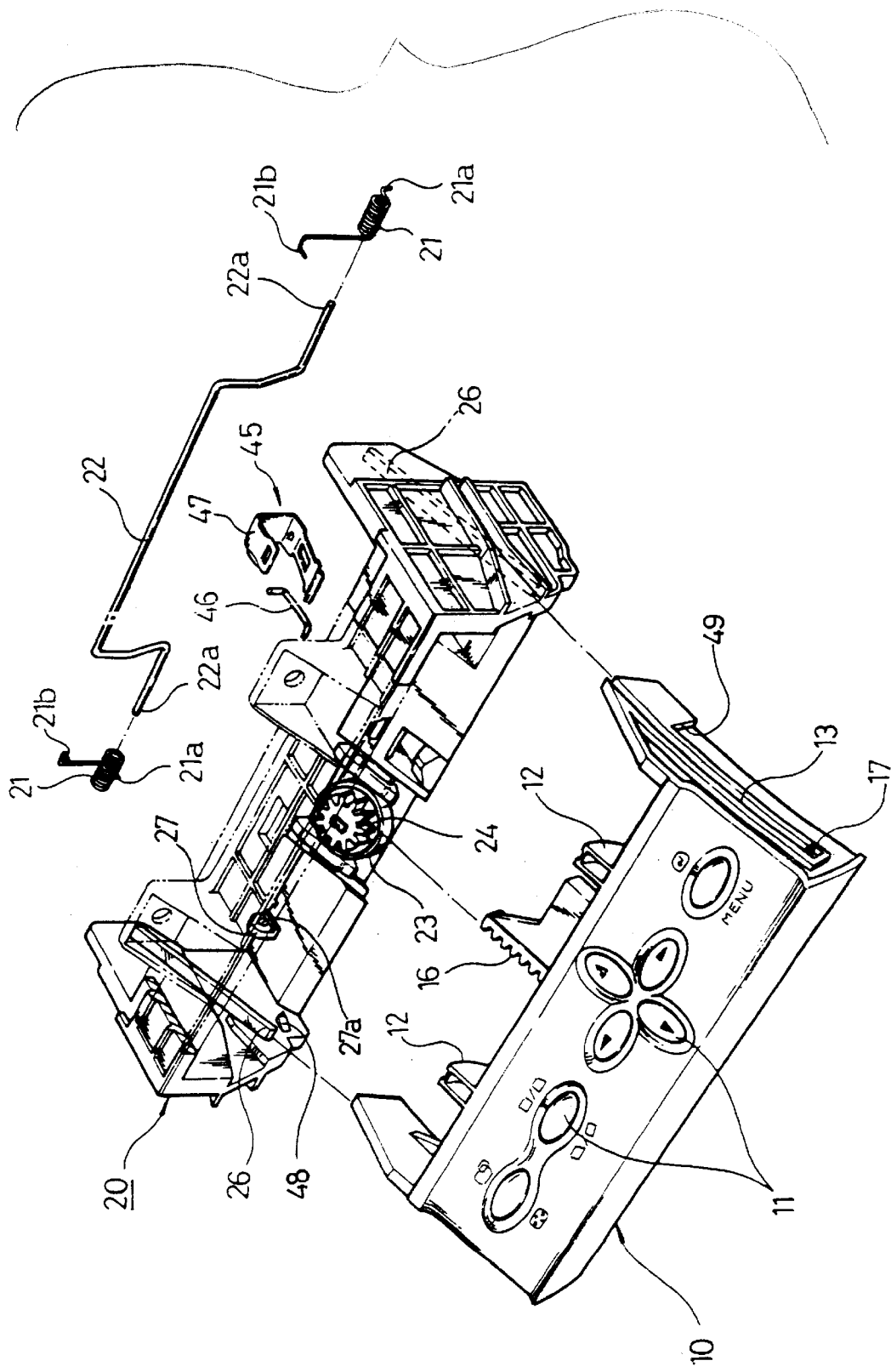
FIG. 4A is a total divided perspective view of the controller according to the present invention.
Figure 4B:
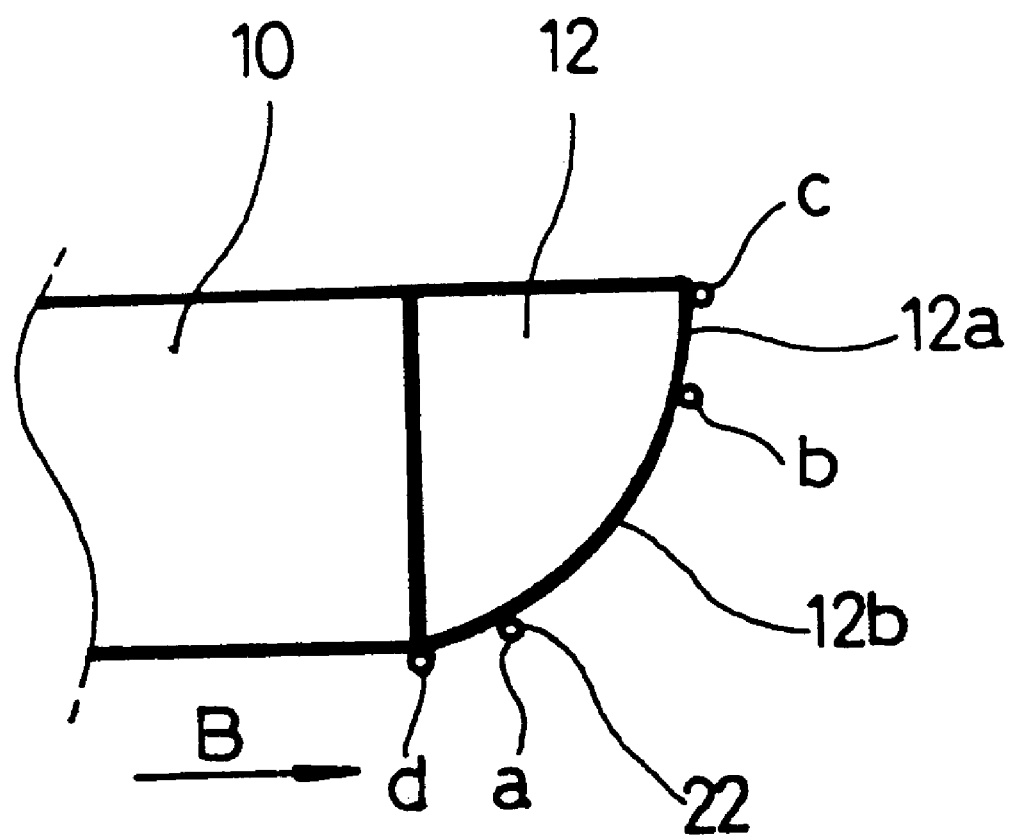
FIG. 4B is a view illustrating an outline of the relationship between the curved surface part shown in FIG. 4A and the pressing member.

FIG. 4A is a total divided perspective view of a controller according to the present invention. As shown in FIG. 4A, the control box 10 is provided with a pair of curved surface parts 12 protruding against a backside thereof and formed in the backside of the control box 10. Each curved surface part 12, as shown in FIG. 4B, is formed to have different inclinations, that is, to have a sharp inclination part 12a in an upper part of the curved surface part and a slow inclination part 12b in a lower part of the curved surface part. Each curved surface part 12 contacts a pressing member 22 formed with a wire rotatably mounted on the housing 20. The pressing member 22 presses the curved surface parts 12 against the drawing hole 5 formed in the front side of the case 2 by the elasticity of an elastic member 21.

As described above, the control box 10 is slid toward the outside through the drawing hole 5 by the elastic force of the elastic member 21 and so drawn out. When the control box 10 is inserted into the housing 20, the pressing member 22 is located in a first position as shown in FIG. 4B. In addition, when the control box 10 is drawn out of the inserted position, it is pushed in the direction of the "B" arrow. Therefore, the pressing member 22 is located at a fourth position "d" and is then guided along the curved surface parts 12 toward a third position "c" along the slow inclination part 12b and the sharp inclination part 12a and, thereafter, when the control box 10 is finally drawn out, the pressing member is located at the second position "b".

Further, the control box 10 is provided with a rack 16 extending in the direction of movement of the control box 10 in the middle of the control box 10 between the curved surface parts 12 formed in a rear side of the control box 10. The rack 16 is combined with a gear 24 rotatably mounted on a damper 23, which is solidly mounted on the housing 20. The damper 23 functions as a speed reducing device with which the control box 10 is inserted or drawn out.

Figure 5:
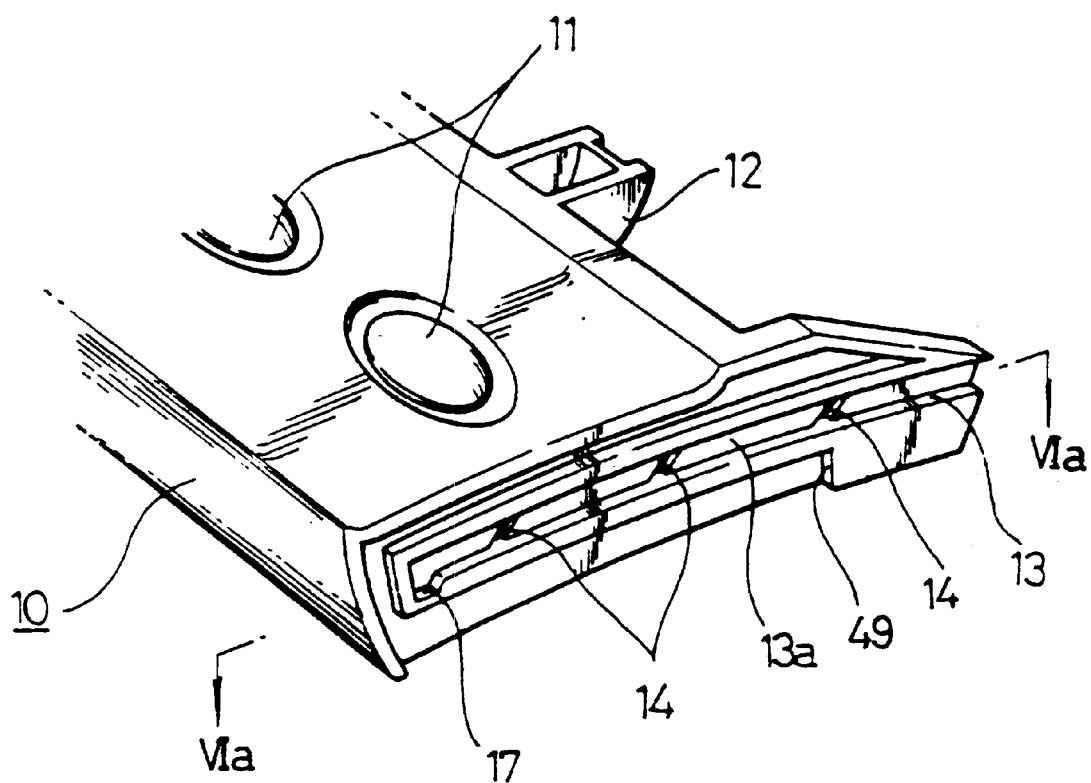
FIG. 5 a partial enlarged perspective view showing the guide and lubricating system of the control box according to the present invention.

In the meantime, the control box 10 is provided with a pair of guide grooves 13 extending in a direction of movement of the control box 10 on respective opposite sides thereof. Each guide groove 13, as shown in FIG. 5, has a plurality of lubricant receiving grooves 14 filled with lubricant 15 in the bottom 13a. Each lubricant receiving groove 14 has a predetermined angle of inclination in the direction of movement of the control box 10. When the control box 10 is moved, the movement of the control box 10 can be facilitated by the lubricant 15. Each guide groove 13, as shown in FIG. 6B, is formed in a circular arc shape.

Each guide groove 13 is combined with a guide bar 26 formed in respective opposite sides of the housing 20. The guide bars 26, as shown in FIG. 4A, each extend in the direction of movement of the control box 10 and are each formed in a circular arc shape having the same semidiameter as the guide grooves 13. The guide grooves 13 are each provided with a front lower surface 17 formed in a straight plane in order to draw out the control box 10 at such an inclination that the functional keys 11 of the control box 10 can be easily used.

Figure 6A:
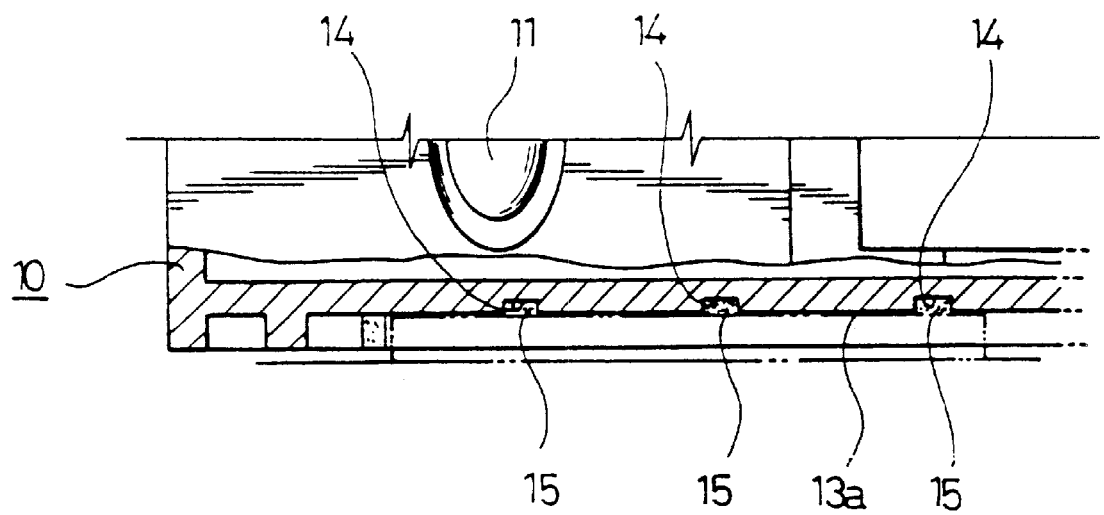
FIG. 6A is an enlarged sectional view of line VIa—VIa in FIG. 5.
Figure 6B:
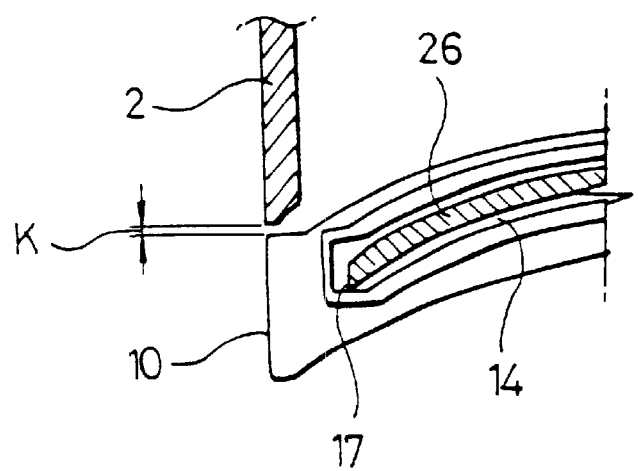
FIG. 6B is a main side sectional view illustrating room for movement of the control box and the case according to the present invention.

However, as shown in FIG. 6B, as the front lower surfaces 17 of the guide grooves 13 are each formed in a straight plane, the front lower surfaces 17 are slid in a straight line along the respective guide bars 26 of the housing 20 and the control box 10 is inserted or drawn out in a straight line so that the moveable space between the case 2 and the control box 10 can be bigger. When the control box 10 is inserted or drawn out through space k between the case 2 and the control box 10, interference by the case 2 on the control box 10 can be prevented.

When the control box 10 is guided and inserted or drawn out by the guide bars 26, lubricant 15 is dispersed to a contacting surface between each guide groove 13 and the respective guide bar 26 act as a lubricant. With this lubrication, the control box 10 can be guided smoothly by the guide bars 26.

In addition, when the control box 10 is drawn out of the housing 20, the control box 10 is prevented from slipping away from the housing 20 because of stoppers 49, which are protrusions for preventing the control box 10 from slipping away from the housing and are provided near the respective guide grooves 13. Each stopper 49 is formed within the housing 20.

Figure 7:
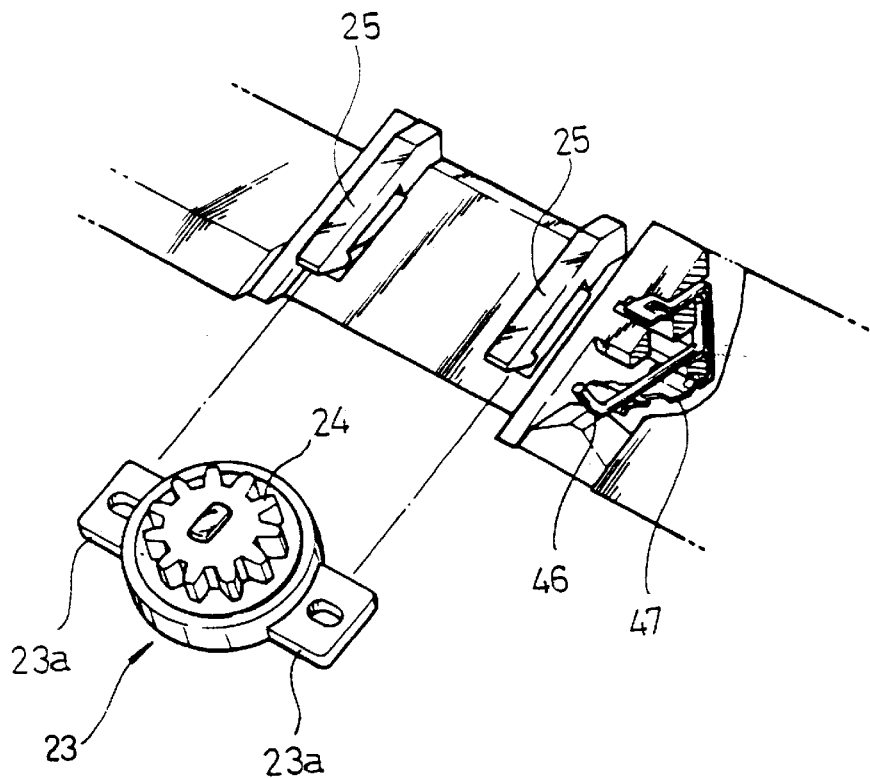
FIG. 7 is a perspective view showing the combination structure of the damper according to the present invention and the open cam part of the heart cam constraint device.

FIG. 7 illustrates the damper 23 shown in FIG. 4A in detail. As shown in FIGS. 4–7, the damper 23 has a circular shape having a pair of ribs 23a on respective opposite sides and, on the upper part thereof, a gear 24, which is combined with the rack 16 of the control box 10, is rotatably mounted. The gear 24, when rotated by the movement of being inserted or drawn out of the control box 10, is mounted so that the rotation thereof is restrained by the damper 23. As the structure for restraining the rotation is well known, there is no need to explain it in detail here.

Figure 8:
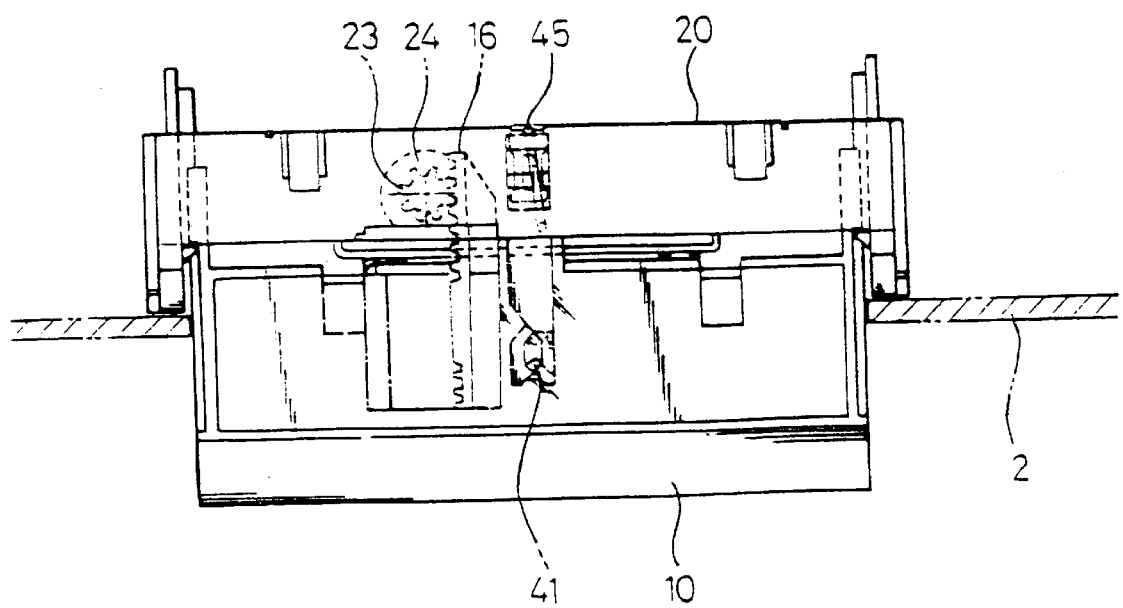
FIG. 8 is a flat view showing an outline of the controller according to the present invention.

The damper 23, as the ribs 23a provided on both sides thereof are inserted into and fixed to a pair of clips 25 formed in the middle of the housing 20, is fixed to the housing 20. The gear 24, as described above and shown in FIG. 8, is combined with the rack 16 provided at the rear middle part of the control box 10. Therefore, as the rack 16 is moved toward a direction where the control box 10 is inserted or drawn out, the gear 24 is rotated toward the direction of movement of the rack 16.

The control box 10 is prevented from being rapidly inserted or drawn out by the shape of the curved surface parts 12 and the damper 23. That is, when the control box 10 is inserted into the housing 20, the pressing member 22 is located in the first position "a" of FIG. 4A and, when the control box 10 is drawn out, the curved surface parts 12 are each pushed toward the direction of the second position "b". Thus, the pressing member 22 is located in the fourth position "d" and, thereafter, as the curved surface parts 12 are moved toward a direction opposite to the "b" direction by the elasticity of the elastic member 21, the pressing member 22 is guided along the curved surface parts 12 toward the third position "c" along the slow inclination parts 12b and the sharp inclination parts 12a. The pressing member 22 is then located in the second position "b" when the control box 10 is finally drawn out.

Accordingly, the control box 10 is slowly drawn out at a predetermined speed while the pressing member 22 pressures the slow inclination parts 12b from the fourth position "d" to the second position "b". As the displacement of the curved surface parts 12 is small while the pressing member 22 is guided along the sharp inclination parts 12a when it is almost completely drawn out, the control box 10 can be drawn out at a slower speed.

In addition, as the damper 23 is located in the middle part of the housing 20, a restraint function for restraining the insertion or drawing out of the control box 10 can be dispersed evenly between both sides thereof. Therefore, in comparison to conventional techniques in which a damper is provided at only one side of a control box, the present invention is more advanced.

Figure 9:
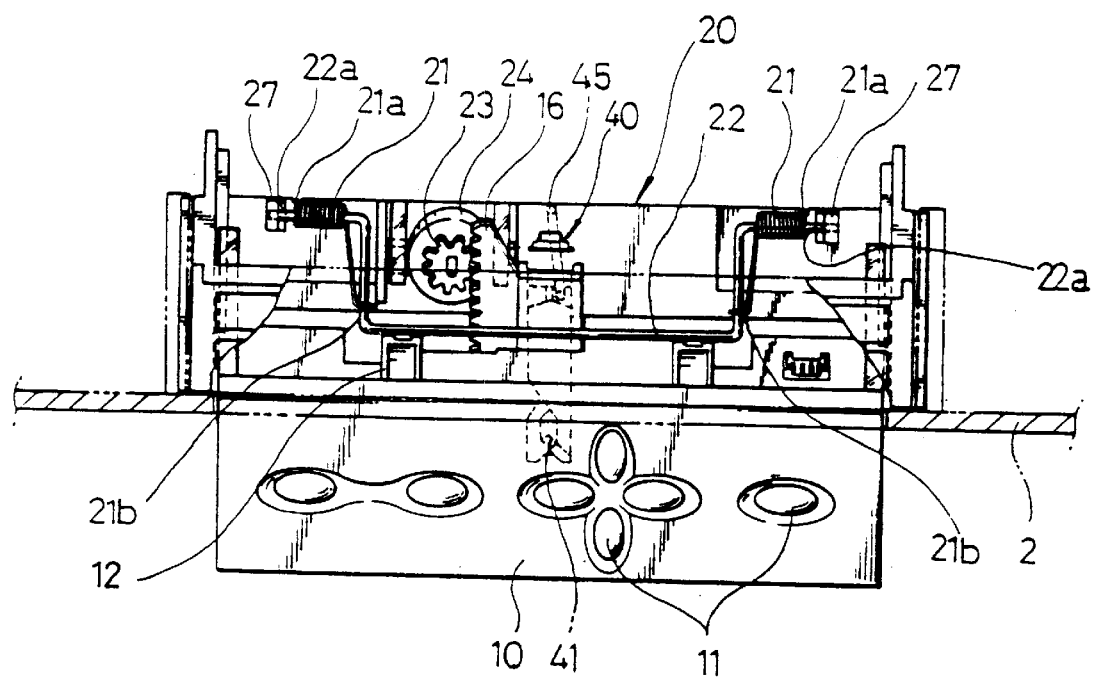
FIG. 9 is a flat view showing the controller in detail according to the present invention.
Figure 10:
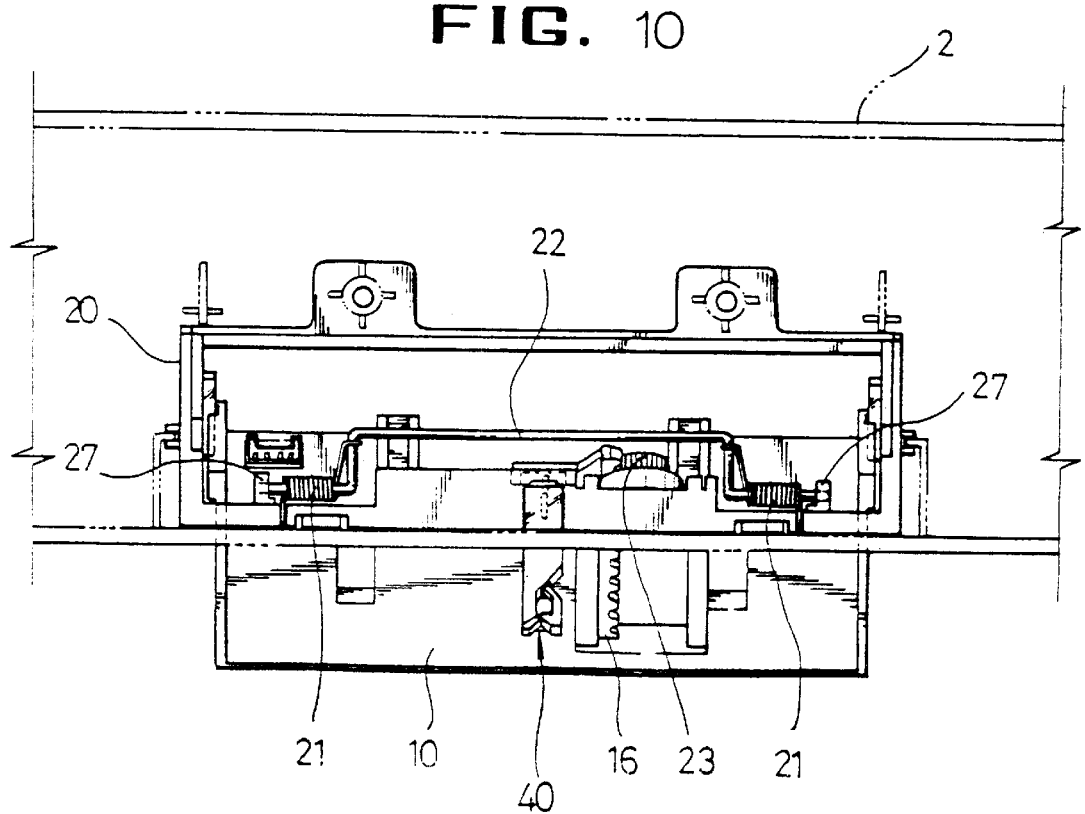
FIG. 10 is a rear view of FIG. 9.

As shown in FIGS. 4A, 9 and 10, a pressing member 22 is made of wire and has two edge parts 22a which are respectively inserted into holes 27a, each respectively formed in a pair of supporting brackets 27 provided at a lower side of the housing 20. In addition, the elastic members 21, each comprising a coil spring, are mounted on the respective edge parts 22a of the pressing member 22 to provide an elastic force to the pressing member 22. Each edge part 21a of the elastic members 21 is fixed to the housing 20 and each other edge part 21b thereof is formed in a hook shape and is hooked to the pressing member 22 in a direction where the pressing member 22 is pushed toward a drawing hole 5. Accordingly, the pressing member 22 is always pressed toward the drawing hole 5 by the elastic members 21 and the control box 10 is always pressed toward the drawing hole 5 by the contact of the curved surface parts 12 provided at the rear side with the pressing member 22.

Figure 11A:
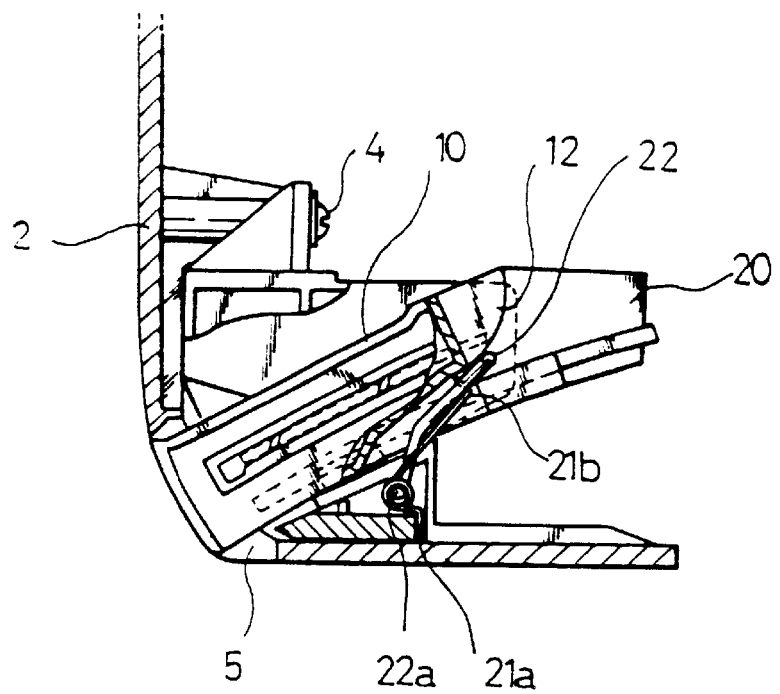
FIGS. 11A–11C are operation side sectional views showing how the control box according to the present invention is drawn out.
Figure 11B:
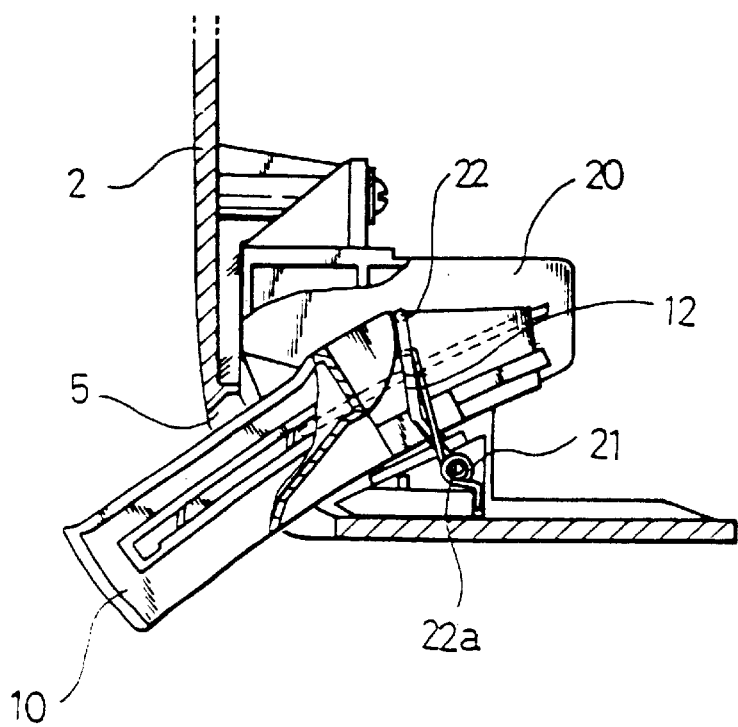
Figure 11C:
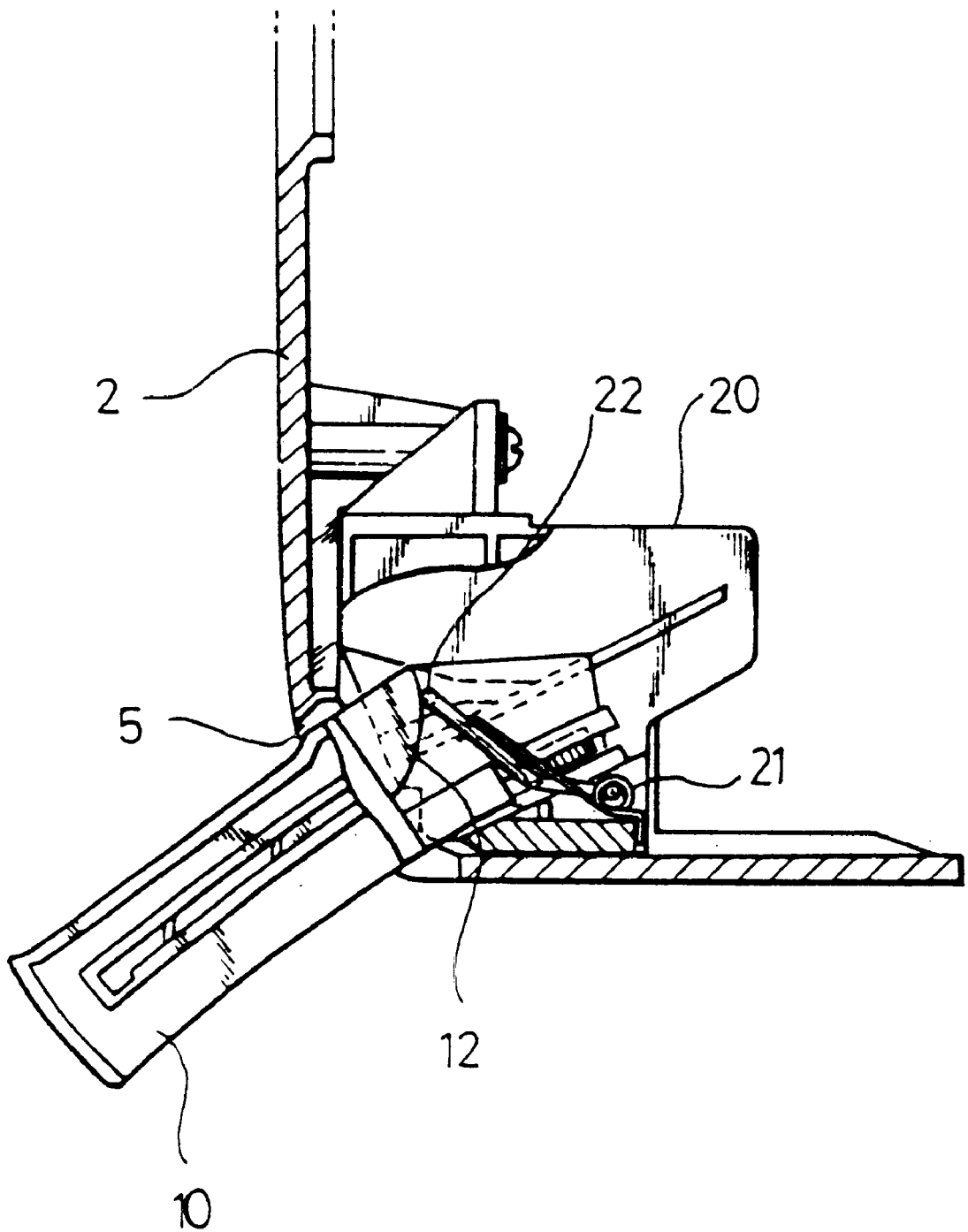

FIGS. 11A–11C show how the control box 10 is drawn out or inserted by the pressing member 22. That is, the control box 10 is stopped when drawn out or inserted by a heart cam constraint device 40. When the control box 10 is inserted into the housing, the pressing member 22, as shown in FIG. 11A, is pushed backward by the control box 10 and then continues to be pushed backward by the heart cam constraint device 40.

Further, the pressing member 22, contacting directly with the curved surface parts 12 of the control box 10, presses the lower sides of the curved surface parts 12 toward the drawing hole 5. Thus, when the control box 10 is drawn out, the curved surface parts 12 of the control box 10 receive more pressing force from the pressing member 22 but the control box 10 is drawn out by the damper 23 at a predetermined speed. When the control box 10, as shown in FIG. 11B, is drawn out halfway, the curved surface parts 12 of the control box 10 receive only a small amount of pressing force from the pressing member 22 but the control box 10 is drawn out at a faster speed. However, when the control box 10, as shown in FIG. 11C, is drawn out to the finishing point, the pressing force of the pressing member 22 to the curved surface parts 12 of the control box 10 diminishes and, therefore, the drawing speed of the control box 10 decreases.

As shown above, the control box 10 according to the present invention is drawn out at graduated speeds. That is, as the control box 10 is drawn out faster to the halfway point, faster drawing movement is possible. However, when the control box 10 is drawn out further to the finishing point at a slower speed, a crash noise will not occur.

Figure 12:
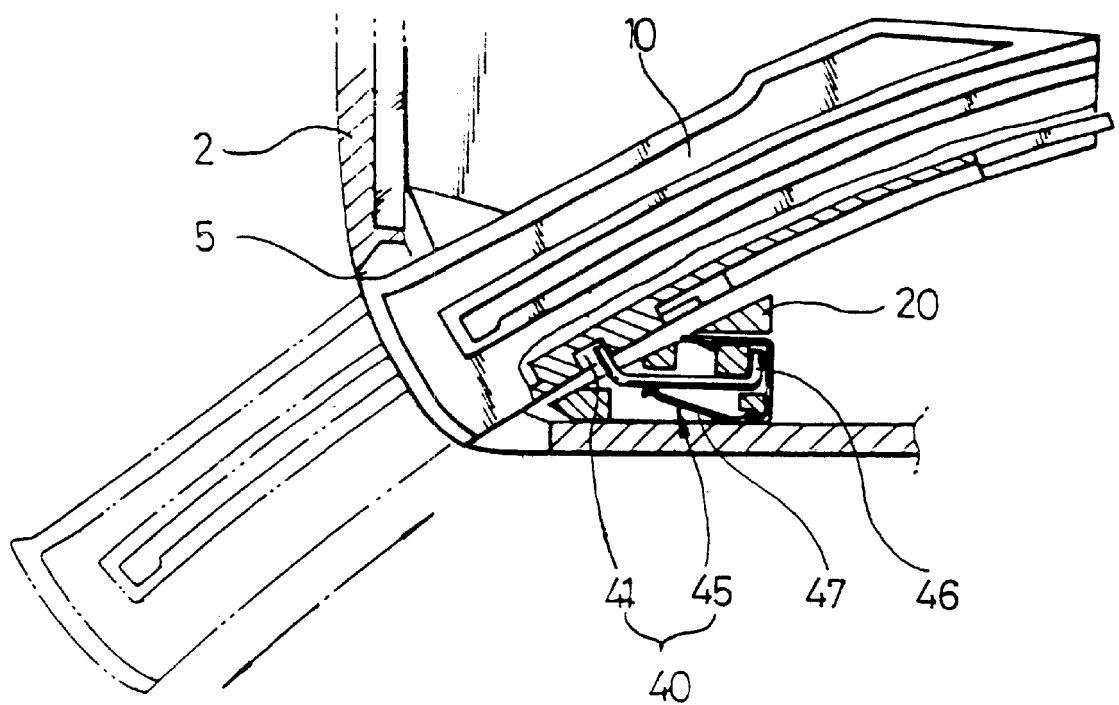
FIG. 12 is a side sectional view illustrating how the control box is inserted or drawn out by the heart cam constraint device according to the present invention.

The heart cam constraint device 40 includes a heart cam 41 formed at a lower side of the control box 10 and a cam driven member 45 provided at the lower side of the housing 20 to make a cam movement with the heart cam 41. FIG. 12 is a sectional view of the heart cam constraint device 40 including the heart cam 41 and the cam driven member 45.

Figure 13:
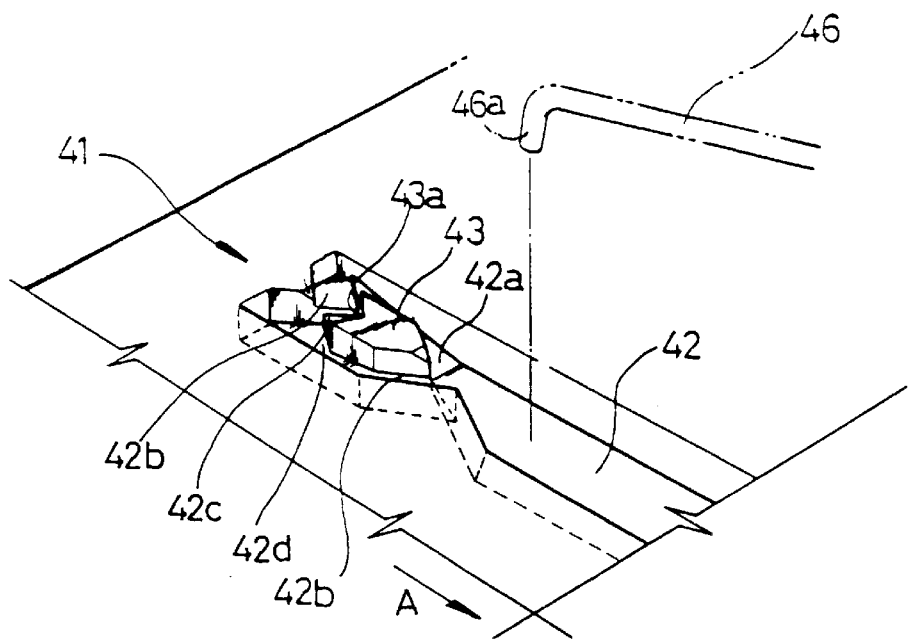
FIG. 13 is a perspective view showing the heart cam of the heart cam constraint device according to the present invention.

As shown in FIG. 12, the cam driven member 45 includes a pin 46, an edge part of which is rotatably mounted on the lower side of the housing 20 and the other edge part 46a (as shown in FIG. 13) of which is guided along the heart cam 41 formed in the lower middle part of the control box 10 and a flat spring 47 pressing toward a lower side of the housing 20 to press pin 46 to the heart cam 41.

FIG. 13 illustrates the heart cam 41 formed in the lower middle part of the control box 10. The heart cam 41 includes a pin path 42 guiding the pin 46 when the control box 10 is inserted and a heart-shaped protrusion 43 is formed in the pin path 42 to be hooked to the pin 46 when the control box 10 is inserted. The front end portion of the heart-shaped protrusion 43 facing the drawing hole 5 is formed as a V-shaped protrusion and the rear end portion has a V-shaped hook groove 43a.

The pin path 42 has four bottom surfaces 42a, 42b, 42c, 42d with different heights around the heart-shaped protrusion 43. When the control box 10 is moved in the insertion direction, the first bottom surface 42a, which is guided along a guide surface 42e forming a side of the front end portion of the heart-shaped protrusion 43, is inclined upward, as shown in FIG. 13, in the insertion direction of the control box 10. The second bottom surface 42b is formed lower than the first bottom surface 42a in the boundary of the line extending from the V-shaped hook groove 43a of the heart-shaped protrusion 43 and is inclined downward toward the V-shaped hook groove 43a. The third bottom surface 42c is positioned lower than the second bottom surface 42b in the boundary of the step part 43b shown in FIG. 14. The fourth bottom surface 42d, placed in the rear of the heart shaped protrusion 43, is positioned lower than the third bottom surface 42c and is inclined upward toward the guide surface 42e from the lower position.

As the pin path 42 of the heart cam 41 is formed as described above, a position of the pin 46 according to the drawing out or inserting of the control box 10 can be explained in conjunction with FIG. 14 and FIGS. 15A–15B, as follows.

Figure 15A:
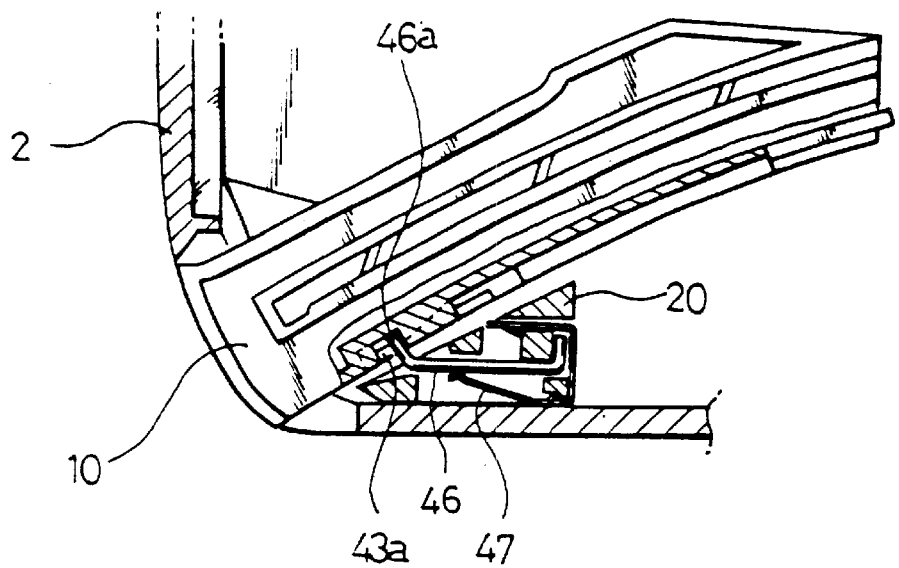
FIGS. 15A–15B are side sectional views showing how the control box is inserted or drawn out by the heart cam constraint device according to the present invention.
Figure 15B:
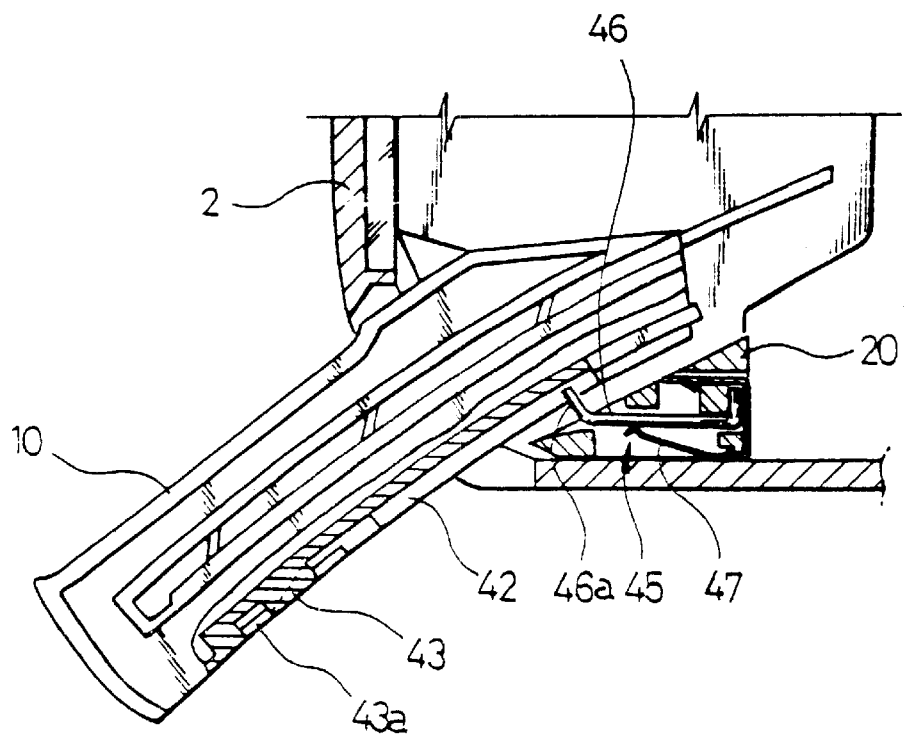

As shown in FIG. 15B, when the drawn control box 10 is received by the user, the heart cam constraint device 40 provided at the lower side of the control box 10 is moved in a direction A of FIG. 13 toward the pin 46 pressed to the pin path 42 by the flat spring 47. As the heart cam constraint device 40 is moved, the pin 46 contacts the guide surface 42e and as the guide surface 42e continues to move, the first bottom surface 42a inclined upward contacts the pin 46.

When the control box 10 reaches an inserted position, an end portion of the pin 46 is positioned in the second bottom surface 42b formed lower than the first bottom surface 42a. Then, the end portion of the pin member 46 is positioned against the second bottom surface 42b and the user finishes inserting the control box with the corresponding sound.

Figure 14:
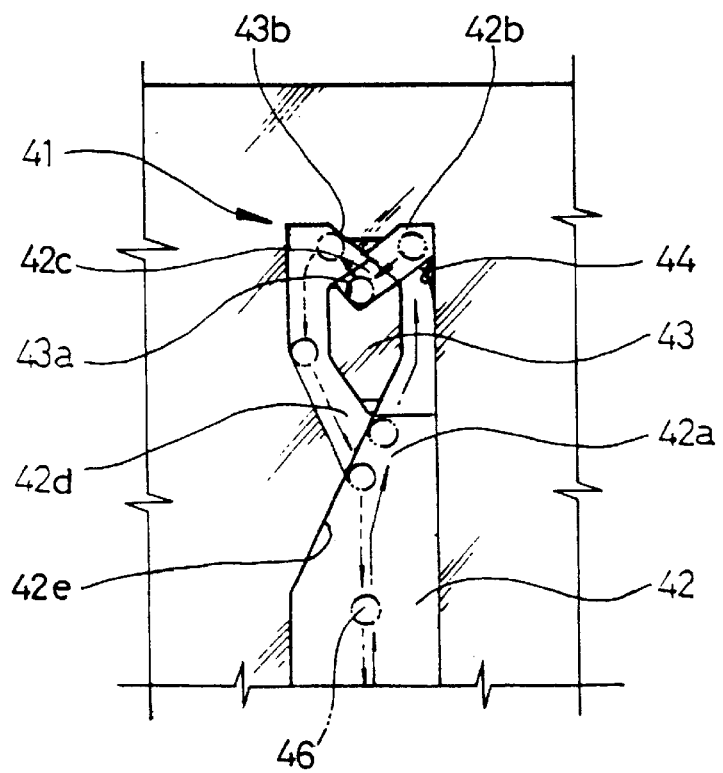
FIG. 14 is an operation view showing the operation of the heart cam constraint device.

The heart-shaped protrusion 43 is pushed in the drawing out direction by the force of the pressing member 22 according to the insertion by the user and, thus, the pin 46 is lead to the third bottom surface 42c formed lower than the second bottom surface 42b along a leading part 44, shown in FIG. 14, and hooked to the V-shaped hook groove 43a of the heart-shaped protrusion 43. Then, the insertion of the control box 10 is finished, as shown in FIG. 15A.

If the control box 10 is pressed the direction "A" of FIG. 13 by the user when the inserted control box 10 is drawn out, a step part 43b is hooked to the pin 46 and the pin 46 is moved sideways along the step part 43b. Thus, when the user releases the pressure of the control box 10, the control box 10 is drawn out through the drawing hole 5 by the force of the pressing member 22 and the pin 46 follows the trace shown in FIG. 14.

FIGS. 15A–15B illustrate how the control box 10 is inserted or drawn out and further illustrate the heart cam 41 of the heart cam constraint device 40 and the cam driven member 45.

The cam driven member 45 is shown in FIG. 7 in detail and the pin 46 is designed to always be pushed by the flat spring 47, an end portion of which is fixed to the housing 20. Therefore, the pin 46 does not secede from the pin path 42 while travelling the pin path 42.

It is described above that guide bars 26 are respectively formed within both sides of the housing 20 and guide grooves 13 are respectively formed on both sides of the control box 10. However, this is only one example. In reverse, the guide grooves 13 can be formed in the housing 20 and the guide bars 26, which are respectively received in the guide grooves 13, can be formed in the control box 10. Here too, receiving grooves for holding lubricant are formed in bottom surfaces of each guide groove, respectively.

As explained above, the control box can be smoothly drawn out by the elastic member and the pressing member according to the present invention.

Although a preferred embodiment of the present invention has been shown and described, it would be appreciated by those skilled in the art that changes may be made in this embodiment without departing from the principles and spirit of this invention, the scope of which is defined in the claims and their equivalents.

What is claimed is:

1. A controller comprising:
   a housing mounted on a case of the electronic goods and provided with guiders, each within respective opposing sides of said housing;
   a control box including a plurality of function keys on an upper side and insertable into said housing and guidable by the guiders and including a rack positioned between a pair of curved surfaces in a rear of said control box;
   an elastic member mounted on a rear of said housing;
   a pressing member pressing the pair of curved surfaces of said control box by an elastic force of said elastic member;
   a device combined with the rack and to reduce a speed of said control box when said control box is drawn out from or inserted into said housing; and
   a heart cam constraint device to stop said control box when said control box is inserted into said housing.

2. The controller as claimed in claim 1, wherein the pair of curved surfaces each include a sharp inclination on an upper side thereof and a slow inclination on a lower side thereof.

3. The controller as claimed in claim 1, wherein said pressing member is positioned at the lower side of each of the curved surfaces when said control box is inserted into said housing.

4. The controller as claimed in claim 1, wherein each of the guiders is a guide bar formed in the respective opposing sides of said housing and said control box is provided with guide grooves, each formed in opposing sides of said control box and receiving respective ones of the guide bars.

5. The controller as claimed in claim 1, wherein each of the guiders is a guide groove formed in the respective opposing sides of said housing and said control box is provided with guide bars, each formed in opposing sides of said control box and receivable into respective ones of the guide grooves.

6. The controller as claimed in claim 4, wherein the guide grooves and the guide bars are each formed in a circular arc.

7. The controller as claimed in claim 5, wherein the guide grooves and the guide bars are each formed in a circular arc.

8. The controller as claimed in claim 6, wherein the guide grooves are each provided with a straight line part in a front part of the circular arc.

9. The controller as claimed in claim 7, wherein the guide grooves are each provided with a straight line part in a front part of the circular arc.

10. The controller as claimed in claim 4, wherein the guide grooves each include a plurality of grooves receiving a lubricant at a bottom of each of the plurality of grooves.

11. The controller as claimed in claim 10, wherein each of the plurality of grooves receiving the lubricant has a predetermined angle of inclination in an operating direction of said control box.

12. The controller as claimed in claim 5, wherein the guide grooves each include a plurality of grooves receiving a lubricant at a bottom of each of the plurality of grooves.

13. The controller as claimed in claim 1, wherein said device includes a damper mounted at a middle of said housing and a gear rotatably mounted on an upper side of the damper and combined with the rack of said control box.

14. The controller as claimed in claim 1, wherein said heart cam constraint device includes a heart cam formed at a lower side of said control box and a heart cam driven member provided at a rear lower side of said housing.

15. The controller as claimed in claim 14, wherein the heart cam includes a pin path formed at a lower side of said control box, a heart-shaped protrusion formed at a front of the pin path, a pin guided along the pin path and a flat spring mounted on said housing to press the pin to the pin path.

16. A controller mounted in a housing, comprising:
a control box insertable into the housing, said control box including a pair of curved surface parts in a rear of said control box;
a first device pressing the pair of curved surface parts by an elastic force and reducing a speed of said control box when said control box is drawn out from or inserted into the housing; and
a second device stopping said control box when said control box is inserted into the housing;
wherein each of the pair of curved surface parts is formed to have a first inclination part in an upper part of the curved surface parts and a second inclination part less steep than the first inclination part in a lower part of the curved surface parts.

17. The controller as claimed in claim 16, wherein said first device includes a pressing member and, in response to said control box being inserted into the housing, the pressing member is located in the upper part of the curved surface parts and, in response to said control box being drawn out of the housing, the pressing member is located at the lower part of the curved surface parts.

18. A controller mounted in a housing, comprising:
a control box insertable into the housing, said control box including a pair of curved surface parts in a rear of said control box;
a first device pressing the pair of curved surface parts by an elastic force and reducing a speed of said control box when said control box is drawn out from or inserted into the housing; and
a second device stopping said control box when said control box is inserted into the housing;
wherein said control box further comprises a rack extending in a direction of movement of said control box and provided in a middle of said control box between the pair of curved surface parts in the rear of said control box.

19. A controller mounted in a housing, comprising:
a control box insertable into the housing, said control box including a pair of curved surface parts in a rear of said control box;
a first device pressing the pair of curved surface parts by an elastic force and reducing a speed of said control box when said control box is drawn out from or inserted into the housing;
a second device stopping said control box when said control box is inserted into the housing; and
a damper mounted on a middle part of the housing, which reduces the speed of said control box when said control box is inserted or drawn out of the housing, said damper having a restraint function which is dispersed evenly between opposite sides of the housing.

20. A controller mounted in a housing, comprising:
a control box insertable into the housing, said control box including a pair of curved surface parts in a rear of said control box;
a first device pressing the pair of curved surface parts by an elastic force and reducing a speed of said control box when said control box is drawn out from or inserted into the housing; and
a second device stopping said control box when said control box is inserted into the housing;
wherein said control box further comprises a pair of guide grooves extending in a direction of movement of said control box; and
wherein each of said pair of guide grooves is disposed on respective opposite sides of said control box, with each of said guide grooves comprising a plurality of lubricant receiving grooves filled with a lubricant in a bottom thereof, wherein each of the lubricant receiving grooves has a predetermined angle of inclination in the direction of movement of said control box and the lubricant facilitates movement of said control box.

21. A controller mounted in a housing, comprising:
a control box insertable into the housing, said control box including a pair of curved surface parts in a rear of said control box;
a first device pressing the pair of curved surface parts by an elastic force and reducing a speed of said control box when said control box is drawn out from or inserted into the housing;
a second device stopping said control box when said control box is inserted into the housing; and
a pair of guide bars formed within respective opposite sides of the housing;
wherein said control box further comprises a pair of guide grooves extending in a direction of movement of said control box, wherein each of said pair of guide grooves is disposed on respective opposite sides of said control box; and
wherein each of said guide grooves is combined with a respective one of said pair of guide bars and each of said guide grooves is provided with a front lower surface formed in a straight plane, the front lower surfaces sliding in a straight line along said guide bars, respectively, such that said control box is inserted or drawn out in a straight line.

22. A controller mounted in a housing, comprising:
a control box insertable into the housing, said control box including a surface part in a rear of said control box; and
a device pressing the curved surface part by an elastic force;
wherein said device and the curved shape of the surface part act in combination to gradually decrease a speed of said control box while said control box is drawn out from or inserted into the housing.

23. The controller of claim 22, wherein the speed of said control box gradually decreases by gradually decreasing an amount of a pressing force applied by said device against the curved surface part while said control box is drawn out from the housing.

24. The controller of claim 23, wherein said control box, while said control box is drawn out of the housing between a starting point and a stopping point, achieves and maintains a first speed at a first stage extending from the starting point to a halfway point roughly halfway between the starting and stopping points, and gradually decreases the first speed after the first stage such that said control box gradually decelerates until it reaches the stopping point.

25. A controller mounted in a housing, comprising:

a control box insertable into the housing, said control box including a pair of surface parts in a rear of said control box; and a device pressing the pair of surface parts by an elastic force;

wherein said device and the pair of surface parts act in combination to vary a speed of said control box while said control box is drawn out from or inserted into the housing, and wherein the pair of surface parts are curved such that, in combination with said device, the speed of said control box varies.

26. The controller of claim 25, wherein the speed of said control box varies according to a distance from the housing.

* * * * *